UNITED STATES PATENT OFFICE.

GUSTAVE BOURGADE, OF NEW YORK, N. Y.

IMPROVEMENT IN TREATING MARINE PLANTS TO OBTAIN GELATINE, &c.

Specification forming part of Letters Patent No. 112,535, dated March 14, 1871.

*To all whom it may concern:*

Be it known that I, GUSTAVE BOURGADE, of the city of New York, in the county and State of New York, have invented a new and Improved Process of Treating Marine Plants and Maritime Lichens for Industrial Purposes; and I do hereby declare that the following is a full, clear, and exact description thereof, which will enable others skilled in the art to make and use the same, reference being had to the accompanying drawing, forming part of this specification.

This invention has for its object to separate the gelatine contained in marine plants and maritime lichens from the other constituents of the same, in order to make such gelatine in its pure state useful for the arts and industries.

The invention consists in a new process of treating said plants by decomposing the same, and then precipitating or evaporating the solution, so as to find the gum in the precipitate or settlement, as hereinafter more fully described.

Among the plants which I intend to include in my new process are the following, to wit: corals, sponges, sea-weed, sea-moss, Iceland and reindeer moss, as well as all other marine plants and maritime lichens containing gelatine.

The plants to be treated I first soak in water, using about five parts, by weight, of water to one of the gelatinous matter.

To the water I add a small portion of malt or the extract of malt—*i. e.*, the grain while in a state of germination, or the extract now in market of such grain. The compound thus produced I boil for about two hours, causing thereby a decomposition of the soluble parts of the plant and a separation therefrom by subsequent settlement of the insoluble contents. After boiling, the mixture is filtered to separate the solution from the insoluble matter.

By the addition of four parts of alcohol to one of the plant used I precipitate the gelatine contained in the aforesaid solution, while the salts also contained therein remain dissolved in the mixture of water and alcohol. The whole matter is once more filtered, or the liquid poured off, so that the gelatine precipitate may be retained.

This gelatine can be used in the arts for the same purposes to which gum-tragacanth and other gums are now applied for printing, fixing colors, &c.

In place of the malt, or extract of malt, nitric or other acid may be used to aid in dissolving the gelatinous constituents of plants.

The use of alcohol for precipitating the dissolved gum may be dispensed with by washing the plants repeatedly in fresh water or other liquid until all the salts and non-gelatinous substances have been removed, then decomposing by malt, as aforesaid, and distilling to evaporate the water, when the pure gum will remain. Besides this latter mode being more laborious than that first described, it is also less economical, since it tends to wash away the salts and valuable minerals held in solution in all marine plants and maritime lichens, and which may be retained by proper treatment of the liquids holding them in solution.

Having thus described my invention, I claim as new and desire to secure by Letters Patent—

The herein-described process of treating marine plants and maritime lichens for extracting the gelatine contained therein, as set forth.

GUST. BOURGADE.

Witnesses:
   A. V. BRIESEN,
   T. B. MOSHER.